United States Patent Office 3,726,837
Patented Apr. 10, 1973

3,726,837
POLYMERIZATION OF ETHYLENICALLY UNSATURATED MONOMERS WITH A 1,2-DIARYL-1,2-DICYANO-ETHANE
Hendrik A. P. de Jongh, Dieren, and Cornelis R. H. I. de Jonge, De Steeg, Netherlands, assignors to Akzo, N.V., Arnhem, Netherlands
No Drawing. Filed July 2, 1970, Ser. No. 52,073
Claims priority, application Netherlands, July 8, 1969, 6910428
Int. Cl. C08f 1/78, 7/04
U.S. Cl. 260—77.5 UA                      8 Claims

ABSTRACT OF THE DISCLOSURE

A process for effecting free radical-initiated chemical reactions of organic compounds which comprises effecting reaction of an organic compound in the presence of a free radical initiator compound comprising a 1,2-diaryl-1,2-dicyano-ethane compound that has a substituent group selected from the class consisting of an acyl group, a carbonamide group, and an esterified carboxyl group in the 1- and 2-positions. Also, a process for preparing the initiator compounds is disclosed.

---

This invention relates to a process for effecting radical-initiated chemical reactions in the presence of unique 1,2-diaryl-1,2-dicyano-ethane compounds and to a process for preparing these initiator compounds.

Examples of reactions initiated by free radicals are: substitution reactions, e.g. the side chain chlorination of toluene; alternate substitution and additional reactions, e.g. the addition of cyclohexane to formaldehyde; polymerization reactions of unsaturated monomers such as styrene, methylmethacrylate, acrylonitrile, vinylacetate, and the curing of polymers, such as polyester resins.

As radical initiators for carrying out such reactions it has been proposed before to apply particular 1,2-diaryl-1,2-dicyano-ethane compounds, for instance, 1,2-dicyanotetraphenylethane. However, as radical initiator in the polymerization of monomers, this compound is not very active.

Even in the case of a readily polymerizable compound such as styrene only 10% of the amount in which 1,2-dicyanotetraphenylethane has been added is active.

In actual practice this compound can only be used as radical scavenger, for instance in the stabilization of polypropylene.

Advantageously, this invention provides a class of substituted 1,2-diaryl-1,2-dicyano-ethane compounds which show substantially improved radical initiation of chemical reactions of organic compounds.

Thus this invention contemplates a process for carrying out free radical-initiated chemical reactions in the presence of a 1,2-diaryl-1,2-dicyano-ethane compound which has an acyl group, a carbonamide group, or an esterified carboxyl group in the 1- and 2-positions.

The initiator compounds which are used in accordance with this invention are represented by the following general formula:

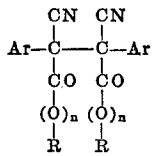

(I)

where Ar is a substituted or non-substituted aryl group; and R represents a hydrocarbon group when $n=0$ or 1, or R represents an amino group with 1 or 2 hydrogen atoms or hydrocarbon groups, when $n=0$.

The two aryl groups, which are attached to the carbon atoms that form part of the intermediate substituted ethane group or moiety, preferably are substituted or non-substituted phenyl groups, but other aryl groups or radicals such as naphthyl, anthracyl and phenanthryl groups may be used as well.

Although it is possible for other groups to be substituted for all of the hydrogen atoms present in the aryl groups, it is preferred that besides the phenyl groups, use should be made of the mono- or disubstituted aryl groups, more particularly the meta- and para-substituted aryl groups. Because of the ease of preparation, the use of para-substituted compounds is very attractive.

Suitable substituents of the aryl groups are, for instance, alkyl groups with 1 to 4 carbon atoms; aryl groups containing 6 to 14 carbon atoms, the halo groups such as fluoro, chloro, bromo and iodo; the acyl groups, esterified or non-esterified carboxyl groups, and alkoxy groups containing 1 to 10 carbon atoms; the aryloxy groups containing 6 to 14 carbon atoms and amino groups in which for the hydrogen atoms other groups may be substituted, and nitro-groups, and arylsulfonyl- and sulfinyl groups, and the like. In general, the groups designated as Ar in Formula I may contain from 6 to 30 carbon atoms.

The hydrocarbon groups represented by R may be an aliphatic hydrocarbon radical containing 1 to 24 carbon atoms, such as an alkyl group, e.g. methyl-, ethyl-, propyl-, isopropyl-, butyl-, or an allyl-, butenyl-, lauryl- or a stearyl-group; a cyclo-alkyl group, for instance cyclopentyl or cyclohexyl; an aryl group, for instance: phenyl, toluyl or naphthyl; or an aralkyl group, for instance a benzyl group. If the group R is an amino group with 1 or 2 hydrogen atoms or hydrocarbon groups, then the last-mentioned hydrocarbon groups are the same as defined for the hydrocarbon groups represented by R. Alternatively, the amino group R may be a cyclic system, for instance: a piperidine group. Accordingly, the R group may contain from 1 to 24 carbon atoms. The nature of the group R has substantially no predominant influence on the activity of the compounds. But the nature of R does influence the solubility and the melting point of the compounds, which property may sometimes be taken advantage of in cases where the solubility of the radical initiator is to be adapted to the reaction medium.

The acyl group, the carbonamide group or the esterified carboxyl group which are in the 1- and 2-positions of the 1,2-diaryl-1,2 dicyano-ethane compounds according to the invention will generally be identical; but this is not essential. For instance, in the 1-position there may be an acetyl group and in the 2-position there may be a —COOHC₃ group. Since these compounds are more difficult to prepare or the preparation thereof results in a relatively low yield, their use is generally not preferred. It is possible to use mixtures of the radical initiators in combination, if desired, with other known radical initiators; for instance a 1:1 mixture of the diethyl ester and dibutyl ester of diphenyldicyano succinic acid, which may for instance be applied as a 50% solution in dibutylphthalate.

It has been found that the use of the afore-mentioned compounds of this invention offers advantages over the use of the known radical initiators.

As compared with the widely employed peroxides, the initiator compounds of this invention offer the advantage of having a far more specific action and giving much less rise to undesirable side reactions such as the formation of undesirable cross-links. An additional advantage is that, unlike the peroxides, the compounds according to the invention are inactive at room temperature so that at this temperature they can be left in the reaction mixture for an indefinite time without giving rise to a reaction. This property makes it possible for the reaction to be carried out at any particular time desired simply by raising the temperature of the reaction mixture.

These compounds also have the advantage over the known use of azodinitriles in that they do not cause the evolution of gas, which is inadmissible in a number of reactions initiated by radicals. Moreover, just as the peroxides, the azodinitriles have the disadvantage that in the reaction medium they are already active at room temperature.

Over the benzopinacols (note for instance the German patent specification No. 1,216,877) the initiator compounds to be employed according to the invention offer the advantage that at a lower temperature they will exhibit a remarkably higher activity.

A very important advantage offered by the compounds of this invention is that they are insensitive to oxygen. This is very surprising in that nearly all the known radical initiating substituted ethanes are highly sensitive to oxygen. Consequently, these known compounds can be used only in a medium that has thoroughly been freed from oxygen. In the process according to the invention the presence of oxygen is not disturbing. That the radical initiators applied according to the invention are highly resistant to oxygen is evidenced by the fact that in a solution of, for instance, ortho-dichlorobenzene these compounds can be shaken for many hours with oxygen at 150° C. without any oxygen being taken up.

The compounds also have a good heat stability. This is illustrated in that in a dilute solution they can be subjected to boiling in chlorobenzene (boiling point 132° C.) without any change taking place. For the purpose of activating the compounds at relatively low temperatures high-energy radiation may be applied.

Since the compounds employed to effect chemical reactions in accordance with this invention are inactive at room temperature it is possible to use them at that temperature in a reaction mixture, after which the reaction can be started at any time by heating the mixture. This is of importance particularly in polymer chemistry, where there is often need for durable, deformable compositions that can be caused to further polymerize at any time by heating them (as is commonly employed for instance in cases where use is made of unsaturated polyester resins). This is an advantage over the usual method by which polymerization is effected in such a way that a short time before the shaping of a "catalyst mixture" is added to the mass, upon which addition the polymerization starts. Mixing the mass shortly before polymerization and the short time for subsequent shaping provide drawbacks for such processes.

In the process according to the present invention compositions of radical initiators and polymerizable compounds such as monomers, prepolymers or polymers, which may still be provided with cross-links, can be fabricated into the desired shape and cured by heating. The term "curing" is to be understood here as referring to polymerization in a wide sense, which means that it need not necessarily be attended with the formation of cross-links. Fabricating the compositions of radical initiators and polymerizable compounds into the desired shape may include, for instance, the forming of covering layers, the casting into molds, applying the compositions to glass fiber structures or to other reinforcements, the impregnation of various types of materials, injection molding, extrusion, film casting, vacuum forming, or various other shaping techniques.

Advantageously, the process for effecting chemical reactions according to the invention may be carried out in several stages. For instance, a monomer may be mixed with the radical initiators according to the invention, followed by heating the mixture in order to start polymerization. The polymerization process may be interrupted by decreasing the temperature. At this stage there is a monomer/polymer mixture (here also referred to as prepolymer) which after being shaped may be subjected to continued polymerization. Obviously, prior to the polymerization process being resumed compounds may, if desired, be added which, upon continued polymerization of the mixture, will give rise to the formation of cross-links.

Examples of compounds that can be polymerized according to the invention are styrene, methyl styrene, acryl compounds such as methyl methacrylate, acrylamide and acrylonitrile and methacrylonitrile, vinyl chloride, vinylidene chloride, vinyl acetate, divinyl benzene, N-vinylpyrrolidone, butadiene, isoprene, chloroprene, diallyl phthalate, diallyl carbonate, diallyl fumarate, and the like vinyl unsaturated monomers, or mixtures of the aforementioned compounds.

The polymerization reactions according to the invention may be carried out by any one of the known techniques. For instance, the monomer or monomer mixture may be polymerized in bulk. Alternatively, polymerization may take place in a solution, a suspension or an emulsion. It will be appreciated that to one skilled in the art, these techniques need not be further elucidated. If desired, the usual additives for such polymerization may be employed. The initiator compounds of the invention may be used in amounts comparable to the known initiators, e.g., about 0.01 to about 5 parts per 100 parts of reactants at elevated temperatures, e.g. from about 40° to about 200° C., the choice of each usually depending on the reactants.

The radical initiators to be used according to the invention may be prepared in the manner known to be applied in the case of similar compounds.

Advantageously, it has been found that these compounds can be prepared in a very simple manner by subjecting a compound having the formula:

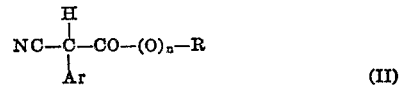

(II)

wherein Ar, R and $n$ are as previously defined in Formula I for the radical initiators, to an oxidative coupling reaction.

Oxidative coupling reactions are known and are widely applied in, inter alia, the preparation of poly-(2,6-dimethylparaphenylene oxide). These reactions may be carried out with the ues of an oxidizing agent such as manganese dioxide, silver oxide, lead dioxide, potassium permanganate, hydrogen peroxide, nitric acid, iodine, potassium ferricyanide, organic perioxides, for instance: ditertiary butyl peroxide, or by an electrochemical oxidation, for instance in acetic acid and in the presence of compounds such as manganous acetate. In actual practice it is for simplicity preferred to use an electrochemical oxidation technique, or to use oxygen under the influence of a catalyst, at temperatures of —70° to +100° C., preferably room temperature.

Particularly favorable results are obtained with the use of copper-amine catalysts. Therefore, the use of such catalysts is preferred. A large number of copper-amine catalysts are described in the British patent specification 982,-471. Since for the preparation of the present compounds very high yields are obtained when use is made of copper-amine catalysts in which the amine is N,N,N',N'-tetramethylethylenediamine, its used is referred. U.S. Pat. 3,306,874 corresponds to the above-noted British patent.)

The invention will be further described in the following examples. In these examples various chemical reactions are carried out by using the following control or radical initiators, which are referred to by the numerals mentioned below:

(1) no radical initiator-control experiment;
(2) 1,2-dicyanotetraphenylethane;
(3) benzopinacol;
(4) benzoyl peroxide; and
(5) azoisobutyric acid dinitrile.

The compounds referred to by the numerals 2 to 5 are known for this purpose; compound 4 being used on a very large industrial scale and compound 5 likewise finding considerable practical application. In the examples which serve to illustrate the present invention use is made of initiator compounds of this invention having the following general formula:

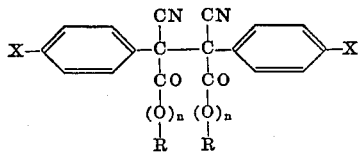

wherein X, R and $n$ represent the groups and integers indicated hereinafter in Table 1. Moreover, of various compounds (which are also referred to by numerals in the following examples) the melting point has been determined.

EXAMPLE I

In a reaction vessel, 100 milliliters of styrene are mixed with 250 milligrams of each of the radical initiators of the type mentioned in Table 2. Also, a control without initiator is used. The resulting mixture is heated to 80° C., which temperature is maintained for 5 hours. every hour the percentage by weight of styrene that has polymerized is determined. This is done by taking a sample from which the polystyrene is isolated by precipitation with methanol followed by drying and weighing. The results obtained with different radical initiators are also listed in Table 2, the afore-mentioned percentage being referred to as conversion.

In the case of initiator catalyst No. 9 the relative viscosity (measured on a 1% by weight solution in chloroform at 25° C.) of the isolated polymer is 1.49 and 2.19 after 2 and 8 hours, respectively. Use under the same conditions of the radical initiators Nos. 6 and 7 gives about the same results as the radical initiator No. 8. Also, it has been found that when used under the same conditions, the radical initiators Nos. 15 and 16 leads to about the same results as obtained with the radical initiator No. 14.

EXAMPLE II

In a reactor vessel, 100 milliliters of methyl methacrylate are mixed with 250 milligrams of one of the radical initiators listed in Table 2. The mixture is heated to 80° C., after which every 30 minutes the conversion is determined in the manner described in Example I. The results are shown in Table 3. Moreover, the use of initiator No. 8 for the described reaction is noteworthy in that the relative viscosity of the product (measured on a 1% by weight solution in chloroform at 25° C.) is 1.78 and 3.1 after 50 and 120 minutes, respectively. Use under the same conditions for this reaction of the radical initiator No. 13 gives about the same results as the radical initiator No. 12. Also, use under the same conditions of the radical initiators Nos. 10 and 11 lead to about the same results as the radical initiator No. 9.

TABLE 1

| Radical initiator number | X is— | R is— | $n$ is— | Melting point in °C. Isomer-mixture | Meso-isomer | Racemic-mixture |
|---|---|---|---|---|---|---|
| 6 | H | CH₃ | 0 | 165–167 | | |
| 7 | H | Phenyl | 0 | 160–185 | | |
| 8 | CH₃ | CH₃ | 0 | 178–180 | | |
| 9 | H | CH₃ | 1 | 158–186 | 182–175 | 163–165 |
| 10 | H | C₂H₅ | 1 | 117–123 | | |
| 11 | H | Phenyl | 1 | 143–144 | | |
| 12 | CH₃ | CH₃ | 1 | 218–220 | 216–217 | 172–175 |
| 13 | CH₃ | —C₁₂H₁₅ | 1 | 66–75 | | |
| 14 | Cl | CH₃ | 1 | 168–212 | 207–213 | 172–174 |
| 15 | NO₂ | CH₃ | 1 | 220–226 | | |
| 16 | OCH₃ | CH₃ | 1 | 195–196 | | |
| 17 | CH₃ | NH₂ | 0 | 218–220 | | |
| 18 | CH₃ | NHCH₃ | 0 | 192,5–193,5 | | |
| 19 | CH₃ | —N(C₅H₈)H₂ (piperidino) | 0 | 231–232,2 | | |

TABLE 2

| Radical initiator number | Conversion in percent after— | | | | |
|---|---|---|---|---|---|
| | 1 hour | 2 hours | 3 hours | 4 hours | 5 hours |
| 1 | 0 | 1 | 3 | 4 | 5 |
| 2 | 1 | 4 | 6 | 8 | 10 |
| 3 | 2 | 5 | 7 | 11 | 13 |
| 4 | 10 | 20 | 27 | 33 | 39 |
| 5 | 20 | 33 | 43 | 49 | 55 |
| 8 | 5 | 9 | 13 | 17 | 20 |
| 9 | 8 | 18 | 25 | 31 | 37 |
| 12 | 15 | 26 | 35 | 41 | 46 |
| 14 | 13 | 24 | 33 | 38 | 43 |

TABLE 3

| Radical initiator | Conversion in percent after— | | | | |
|---|---|---|---|---|---|
| | 30 min. | 60 min. | 90 min. | 120 min. | 150 min. |
| 1 (blank) | 0 | 0 | 0 | 0 | 0 |
| 2 | 0 | 0 | 0.5 | 1 | 1.5 |
| 4 | 25 | 86 | 95 | | |
| 5 | 70 | 99 | | | |
| 8 | 7 | 18 | 33 | 50 | 68 |
| 9 | 13 | 55 | 85 | 97 | 99 |

EXAMPLE III

In this example, 100 milliliters of a vinyl compound listed in Table 4 are mixed with 250 milligrams of the radical initiator No. 9. In each case the mixture is heated to 80° C., after which every hour the conversion is determined in a manner similar to that described in Example I. The results of these experiments are shown in Table 4.

TABLE 4

| Vinyl compound | Conversion in percent after— | | | | |
|---|---|---|---|---|---|
| | 1 hour | 2 hours | 3 hours | 4 hours | 5 hours |
| Styrene | 8 | 17 | 24 | 30 | 36 |
| Vinyl acetate | 8 | 31 | 45 | 57 | 68 |
| Acrylonitrile | 35 | 51 | 62 | 72 | 81 |
| Methyl methacrylate | 60 | 94 | 99 | | |

EXAMPLE IV

In this example, 100 milliliters of styrene are mixed with 250 milligrams of each of the radical initiators listed in Table 5. In each case the mixture is heated to 120° C., after which every hour the conversion is determined in the manner described in Example I. The results of these experiments are shown in Table 5.

TABLE 5

| Radical initiator | Conversion in percent after— | | | |
|---|---|---|---|---|
| | 1 hour | 2 hours | 3 hours | 4 hours |
| 8 | 41 | 59 | | |
| 12 | 41 | 59 | | |
| 17 | 44 | 66 | 84 | 98 |
| 18 | 49 | 84 | 99 | |
| 19 | 34 | 56 | 68 | 73 |

For comparison the radical initiator ditertiary butylperoxide is used. As conversion percentages after 1 and 2 hours conversion values of respectively 13% and 35% are found.

EXAMPLE V

In a glass tube 25 grams of an unsaturated polyester (commercially available under the trade name Ludopal P-6) are mixed with various amounts of radical initiator No. 16 and heated to the temperature indicated. Table 6 lists the amounts of radical initiator added, the temperature to which the mixture is heated, and the time elapsing before gelation takes place, the minimum curing time, and the peak temperature used for the three different runs.

TABLE 6

| Run | 1 | 2 | 3 |
|---|---|---|---|
| Amount of radical initiator added (percent-wt.) | 1.69 | 1 | 1 |
| Heating temp. (° C.) | 60 | 70 | 80 |
| Gelling time (in min.) | 6.2 | 2.0 | 1.1 |
| Curing time (in min.) | 9.5 | 5.1 | 2.5 |
| Peak temperature (° C.) | 192 | 209 | 229 |

EXAMPLE VI

In a reactor vessel 100 milliliters of styrene are mixed with 250 milligrams of one of the radical initiators listed in Table 7. In each experiment, the mixture is heated to 20° C., which temperature is maintained for 20 days. Thereupon the percentage by weight of styrene that has polymerized is determined, which is done by taking a sample from which the polystyrene that has formed is isolated by precipitation with methanol, followed by drying and weighing. The results obtained are listed in Table 7.

TABLE 7

| Radical initiator: | Conversion in percent after 20 days |
|---|---|
| 1 (blank) | 4.5 |
| 4 | 16 |
| 5 | 45 |
| 9 | 4.5 |

The experiment shows that at a temperature of 20° C. the No. 9 initiator compound according to the invention does not promote the polymerization of styrene, which is in contrast to the known radical initiators 4 and 5.

EXAMPLE VII

This example illustrates preparation of the radical initiators of this invention. In reaction vessels 10 grams of each of the compounds having the formula:

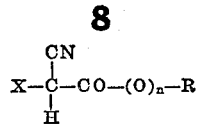

wherein X, R and $n$ have the definitions set forth hereinbefore in Table 1, are dissolved in 100 milliliters of methanol. To the solution are added 2.5 mole percent of cuprous chloride and 5 mole percent of tetramethylethylenediamine. The resulting solution is then shaken with oxygen until the amount thereof that is theoretically required to obtain dimerization has been taken up. The oxygen take up is completed after not more than 2 to 60 minutes. The resulting dimer crystallizes as a mixture of diastereoisomers. The precipitate is filtered off and washed. The yield is in the range of from 60 to 95% of the theoretical yield. It is also found that electrochemical oxidation of the above-mentioned compounds in acetic acid in the presence of a catalytic amount of manganous acetate will result in very high dimer yields of, for instance, more than 90% and often, higher than 95%.

The resulting dimers from these two oxidative routes have the following formula:

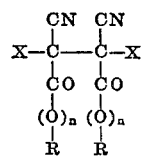

wherein X, R, and $n$ have the same definitions as set forth for the monomer compounds in Table 1.

What is claimed is:
1. In the process for the free radical-initiated polymerization of ethylenically unsaturated monomers, the improvement which comprises using as the free radical initiator a 1,2-diaryl-1,2-dicyano-ethane of the formula:

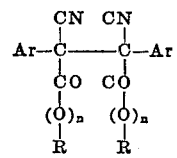

wherein Ar is an aryl group containing from 6 to 30 carbon atoms, $n$ is an integer from 0 to 1, and R is a radical selected from the group consisting of a hydrocarbon group having 1 to 24 carbon atoms when $n=0$ and 1 and an amino group having from 1 to 2 hydrogen atoms or said hydrocarbon groups attached thereto when $n=0$.

2. The process of claim 1 in which the substituent groups in the 1- and 2-positions are identical.

3. The process of claim 1 in which the substituent groups in the 1- and 2-positions are different.

4. The process of claim 2 in which the initiator compound used is selected from those compounds wherein R is an alkyl group containing 1 to 24 carbon atoms, and $n=0$ or 1.

5. The process of claim 1 wherein the unsaturated monomer is selected from the group consisting of styrene, methyl styrene, methyl methacrylate, acrylamide, acrylonitrile, methacrylonitrile, vinyl chloride, vinylidene chloride, vinyl acetate, divinyl benzene, N-vinylpyrrolidone, butadiene, isoprene, chloroprene, diallyl phthalate, diallyl carbonate and diallyl fumarate.

6. The process of claim 1 wherein the initiator is added in an amount of from about 0.01 part to about 5 parts per 100 parts of reactants.

7. The process of claim 1 wherein the polymerization is carried out at a temperature of from about 40° to about 200° C.

8. The process of claim 1 wherein the polymerization is a bulk polymerization.

References Cited

UNITED STATES PATENTS 2,751,406  6/1956  Ipatieff et al. _____ 260—465 H
2,851,477  9/1958  Davis _____ 260—465 H

OTHER REFERENCES

Chemical Abstract, vol. 33, November 1939, p. 8090, "Initiation of Chain Polymerization by Free Radicals."

JAMES A. SEIDLECK, Primary Examiner

U.S. Cl. X.R.

260—78.4 UA, 88.3 R, 88.7 F, 89.1, 89.5 R, 92.3, 92.8 R, 93.5 S, 94.2 R, 465 H, 465 D